(12) United States Patent
Sekimoto et al.

(10) Patent No.: US 7,712,967 B2
(45) Date of Patent: May 11, 2010

(54) BALL BEARING

(75) Inventors: Hiroshi Sekimoto, Sakurai (JP);
Masaaki Ohtsuki, Kashihara (JP);
Akira Koyama, Kashiwara (JP)

(73) Assignee: JTEKT Corporation, Osaka (JP)

( * ) Notice: Subject to any disclaimer, the term of this patent is extended or adjusted under 35 U.S.C. 154(b) by 411 days.

(21) Appl. No.: 11/798,733

(22) Filed: May 16, 2007

(65) Prior Publication Data
US 2007/0269153 A1  Nov. 22, 2007

(30) Foreign Application Priority Data
May 17, 2006 (JP) .......................... P2006-137597
May 29, 2006 (JP) .......................... P2006-148466

(51) Int. Cl.
*F16C 43/06* (2006.01)
*F16C 19/06* (2006.01)

(52) U.S. Cl. ....................... 384/507; 384/446
(58) Field of Classification Search ................ 384/462, 384/470, 473, 488, 507, 509, 511, 512, 446
See application file for complete search history.

(56) References Cited

U.S. PATENT DOCUMENTS

| | | | | |
|---|---|---|---|---|
| 1,420,339 A | * | 6/1922 | Parsons | 384/509 |
| 1,589,415 A | * | 6/1926 | Nides et al. | 384/512 |
| 2,143,091 A | * | 1/1939 | Searles | 384/511 |
| 5,195,396 A | * | 3/1993 | Kamiya et al. | 384/507 |

FOREIGN PATENT DOCUMENTS

| | | |
|---|---|---|
| JP | 7-110029 | 4/1995 |
| JP | 11-190348 | 7/1999 |
| JP | 11-325085 | 11/1999 |
| JP | 2001-140870 A * | 5/2001 |

* cited by examiner

*Primary Examiner*—Marcus Charles
(74) *Attorney, Agent, or Firm*—McGinn IP Law Group PLLC

(57) ABSTRACT

In an outer ring, a first ball filling slot which extends from a first raceway groove to a first end face of one side of an axial direction is formed, and in an inner ring, a second raceway groove and a second ball filling slot which extends from the second raceway groove to a second end face of one side of the axial direction are formed. Circumferential extension grooves which extend from one of the first ball filling slot and the second ball filling slot by a predetermined length in a circumferential direction at the opposite sides of the circumferential direction of the ball filling slot and extend from the first raceway groove to the first end face in the axial direction are formed.

16 Claims, 6 Drawing Sheets

BALL BEARING

BACKGROUND OF THE INVENTION

1. Field of the Invention

The present invention relates to a ball bearing, and more particularly, to a full ball type deep groove ball bearing which is suitably used as a touchdown bearing in a turbo-molecular pump.

2. Related Art

In general, ball filling slots for mounting balls are formed in full ball type deep groove ball bearings as shown in Japanese patent publication No. JP 11-325085A. The ball filling slot extends over inner and outer rings so as to be formed substantially in a circular-shape. The ball filling slot is designed to have a size slightly smaller than the size of the balls such that the ball smoothly rotates and does not escape therefrom. Namely, the ball filling slot is designed to have a size so as to form a small interference to the balls.

In such a full ball type deep groove ball bearing, for mounting the balls, either of the following methods is used. One is a method of directly pressing a ball placed in the vicinity of the ball filling slot into the bearing. The other is a method of inserting a jig (a wedge) into the ball filling slot or a space between the inner ring and the outer ring in the vicinity of the ball filling slot to widen a gap between the inner and outer rings first, and then inserting the balls into the bearing in a state that the interference is hardly remained.

However, in the method of pressing the ball placed in the vicinity of the ball filling slot into the bearing, if the rigidity of the bearing rings is high, a large force for pressing the ball is required so that the balls and the periphery of the ball filling slot of the bearing ring can be easily damaged. The periphery of the ball filling slot can be easily deformed, when a ball is pressed into the slot. On the other hand, as for the method of inserting the wedge into the ball filling slot or the space between the inner ring and the outer ring in the vicinity of the ball filling slot first and then inserting the balls in a state that the interference is hardly remained, this method cannot be used if the gap between the outer diameter of the outer circumferential surface of the inner ring and the inner diameter of the inner circumferential surface of the outer ring is very small, and the wedge cannot be inserted into the space between the inner and outer rings.

On the other hand, conventionally, there is a turbo-molecular pump in which a rotary shaft is magnetically supported with respect to a housing a magnetic bearing with a non-contact state at the time of normal operation and a ball bearing is used as a touchdown bearing to mechanically support the rotary shaft by contacting with the rotary shaft when a vacuum environment is destroyed due to an operation error (artificial error) of a vacuum apparatus decompressed by the turbo-molecular pump such as a switching error of a valve of the vacuum apparatus for example, or due to an emergency state such as the stoppage of power supply. (See, for example, JP 11-190348A.)

Among turbo-molecular pumps having such a construction, there is a turbo-molecular in which a strong 2-pole permanent magnet (functioning as a rotor of a motor) is fixed at one of the rotary shaft and the housing in order to rotate the rotary shaft in high speed with respect to the housing. In this turbo-molecular pump, overcurrent according to the law of electromagnetic induction occurs in the other of the rotary shaft and the housing in which the 2-pole permanent magnet is not mounted due to a magnetic field generated by the 2-pole permanent magnet, and heat is generated in the other of the rotary shaft and the housing in which the 2-pole permanent magnet is not mounted.

It has been known that the heat is not radiated well to the outside of the pump and remains in the pump when the 2-pole permanent magnet is fixed at the housing so that the heat is generated in the rotary shaft. Therefore, this configuration is not suitable. Accordingly, in the turbo-molecular pump, the 2-pole permanent magnet is usually fixed at the rotary shaft so that the heat due to the mount of the 2-pole permanent magnet efficiently radiates to the outside of the pump.

For manufacturing such a turbo-molecular pump, the manufacturing is generally conducted by mounting a ball bearing in a housing first and then passing a 2-pole permanent magnet fixed to a rotary shaft through an inner circumferential surface of an inner ring. Accordingly, the assembling of the ball bearing and the rotary shaft is simplified.

Under such circumferences, the following problem has been found. If bearing rings of the ball bearing are formed of a metal material having high hardness such as a stainless steel or bearing steel to which a hardening treatment is performed in order to increase an impact strength, the inner ring is magnetized to become a magnet when the 2-pole permanent magnet fixed to the rotary shaft passes the inside of the inner circumferential surface of the inner ring. Accordingly, overcurrent may flow in the rotary shaft by a magnetic field generated by the magnetized inner ring, so that the heat is generated in the rotary shaft. In other words, upon normal operation, when the rotary shaft rotates relative to the housing and the ball bearing as the touchdown bearing is in such a condition that the outer ring is fixed to the housing and that the inner ring is not brought into contact with the rotary shaft and does not rotate relative to the outer ring, the heat is generated in the rotary shaft due to the magnetization of the inner ring.

Meanwhile, if the inner ring is formed of a metal material having a weak magnetization property in order to avoid the problem that the heat is generated in the rotary shaft due to the magnetization of the inner ring, the hardness of the inner ring becomes lower so that the inner ring is weak against impact or the cost of the inner ring significantly becomes higher.

SUMMARY OF THE INVENTION

The present invention is made to solve the above-mentioned problems. An object of the invention is to provide a ball bearing in which a ball and bearing rings are hardly damaged at the time of mounting the balls and the balls can be easily inserted into the bearing even when the gap between the outer diameter of the outer circumferential surface of the inner ring and the inner diameter of the inner circumferential surface of the outer ring is very small.

Further, according to another aspect of the invention, it is possible to provide a ball bearing in which temperature of a rotary shaft is not elevated so much even when being used as a touchdown bearing for mechanically supporting the rotary shaft of a turbo-molecular pump, which has high impact strength, and which can be made at low cost.

In order to accomplish the above-mentioned object, according to an aspect of the invention, there is provided a ball bearing including:

an outer ring having a first raceway groove and a first ball filling slot which extends from the first raceway groove to a first end face of one side in an axial direction of the ball bearing;

an inner ring having a second raceway groove and a second ball filling slot which extends from the second raceway groove to a second end face of said one side in the axial direction of the ball bearing; and balls provided between the first raceway groove of the outer ring and the second raceway groove of the inner ring, wherein circumferential extension grooves which extend from at least one of the first ball filling slot and the second ball filling slot at opposite sides of the first ball filling slot in a circumferential direction of the ball bearing by a predetermined length, and extend from the raceway groove to the end face in the axial direction which correspond to said at least one of the first ball filling slot and the second ball filling slot, and the circumferential extension grooves have a maximum inner diameter smaller than a maximum inner diameter of said at least one of the first ball filling slot and the second ball filling slot.

According to the present invention, since at least one of the outer ring and the inner ring has the circumferential extension grooves which extend from the ball filling slot by the predetermined length in the circumferential direction at the opposite sides of the circumferential direction of the ball filling slot, extend from the raceway groove to the end face in the axial direction, and have the maximum inner diameter smaller than the maximum inner diameter of the ball filling slot, the rigidity of the periphery of the first ball filling slot or the second ball filling slot of the outer ring or the periphery of the second ball filling slot of the inner ring can decrease locally. When the ball is pressed and inserted, strain which occurs in the bearing rings can be received by the ball filling slots and the circumferential extension grooves. Therefore, the strain can be locally reduced and the flexibility of the periphery of this ball filling slot can be improved. Accordingly, it is possible to easily insert the balls into the bearing, to suppress damage which occurs in the balls and the peripheries of the ball filling slots of the inner and outer rings when the balls are inserted, and to suppress plastic deformation of the peripheries of the ball filling slots of the inner and outer rings when the balls are inserted.

According to the present invention, since at least one of the outer ring and the inner ring has the circumferential extension grooves at the opposite sides of the circumferential direction of the first ball filling slot, the jig (wedge) can be inserted into the circumferential extension grooves even when the gap between the inner diameter of the inner circumferential surface of the outer ring and the outer diameter of the outer circumferential surface of the inner ring at a position where the circumferential extension grooves do not exist is very small. Accordingly, the method of inserting the ball using the jig can be used.

Preferably, the circumferential extension grooves are formed on the opposite sides of the first ball filling groove formed on the outer ring, because a problem which occurs when the circumferential extension grooves are formed in the rotary ring in a case that the outer ring serves as the stationary ring and the inner ring serves as the rotary ring, that is, ununiformity in rotation of the rotary ring which occurs due to the increase of a difference in the thickness of the circumferential direction of the rotary ring, is not caused.

Alternatively the circumferential extension grooves may be formed on the opposite sides of the second ball filling groove formed on the inner ring, because a problem which occurs when the circumferential extension grooves are formed in the rotary ring in a case that the outer ring serves as the rotary ring and the inner ring serves as the stationary ring, that is, ununiformity in rotation of the rotary ring which occurs due to the increase of a difference in the thickness of the circumferential direction of the rotary ring, is not caused Preferably, a minimum distance between a shoulder of the other side of the axial direction of the first raceway groove of the outer ring and a shoulder of the other side of the axial direction of the second raceway groove of the inner ring is ¼ or less of the diameter of the balls.

According to the above construction, since the minimum distance between the shoulder of the other side of the axial direction of the first raceway groove of the outer ring and the shoulder of the other side of the axial direction of the second raceway groove of the inner ring is ¼ or less of the diameter of the ball and the distance between the other side of the axial direction of the first raceway groove of the outer ring and the shoulder of the other side of the axial direction of the second raceway groove of the inner ring is reduced compared with the conventional art, the strength of the ball bearing is not reduced even when the circumferential extension grooves which may reduce the strength of the ball bearing are formed in the ball bearing. Thus, the ball bearing can hold a predetermined strength.

According to the ball bearing of the present invention, since at least one of bearing rings has the circumferential extension grooves which extend from the ball filling slot by the predetermined length in the circumferential direction at the opposite sides of the ball filling slot and extend in the axial direction from the raceway groove of at least one of the bearing rings to the end face of one side of the axial direction of at least one of the bearing rings, the rigidity of the periphery of the ball filling slot of at least one of the bearing rings can decrease locally. When the ball is pressed and inserted, strain which occurs in the bearing rings can be received by the ball filling slots and the circumferential extension grooves. Therefore, the strain can be locally reduced and the flexibility of the periphery of the ball filling slot of at least one of the bearing rings can be improved. Accordingly, it is possible to easily insert the balls into the bearing, to suppress damage which occurs in the ball and the peripheries of the ball filling slots of the bearing rings when the ball is inserted, and to suppress plastic deformation of the peripheries of the ball filling slots of the bearing rings when the ball is inserted.

According to the ball bearing of the present invention, since the circumferential extension grooves are formed at the opposite sides of the circumferential direction of the ball filling slot, the jig (wedge) can be inserted into the circumferential extension grooves even when the gap between the inner diameter of the inner circumferential surface of the outer ring and the outer diameter of the outer circumferential surface of the inner ring at a position where the circumferential extension grooves do not exist is very small. Accordingly, the method of inserting the ball using the jig can be used.

According to the second aspect of the present invention, there is provided a ball bearing including: an inner ring having a raceway groove and made of a ferromagnetic material; an outer ring having a raceway groove and made of a ferromagnetic material; and a ball provided between the raceway groove of the inner ring and the raceway groove of the outer ring, wherein a distance between a shoulder of one side of an axial direction of the inner ring of the raceway groove of the inner ring and a shoulder of the other side of the axial direction of the raceway groove of the outer ring is ¼ or less of a diameter of the ball.

The ferromagnetic material includes, for example, bearing steel, stainless steel or tool steel. The ferromagnetic material indicates a material which is magnetized in the same direction as a magnetic field if it is placed in the magnetic field and maintains a magnetic property even when the magnetic field is removed.

According to the above-described ball bearing, the inner and outer rings are made of a ferromagnetic material, the distance between the shoulders of one side of the inner and outer rings is ¼ or less of the diameter of the ball, and the distance between the shoulders of one side of the inner and outer rings is significantly smaller than that of the conventional ball bearing, the ball bearing is used as a touchdown bearing of a turbo-molecular pump and the following phenomenon occurs when the bearing and the rotary shaft fixed with the 2-pole permanent magnet are assembled.

That is, first, after the ball bearing is mounted in the housing, a first place of the inner ring and a second place of the outer ring in the same circumferential direction as the first place of the inner ring are magnetized to a first pole while the 2-pole permanent magnet fixed to the rotary shaft passes through the inside of the inner circumferential surface of the inner ring, and a third place of the inner ring opposite to the first place of the inner ring with the rotary shaft interposed therebetween and a fourth place of the outer ring opposite to the second place with the rotary shaft interposed therebetween are magnetized to a second pole.

Next, after the 2-pole permanent magnet fixed to the rotary shaft passes through the inside of the inner circumferential surface of the inner ring, the inner ring rotates by about 180° in the circumferential direction such that the repulsion of the magnetic force between the inner ring and the outer ring are reduced because the inner and outer ring are made of the ferromagnetic material and the distance between the shoulders of one side of the inner and outer rings is much smaller than that of the conventional ball bearing. The first place and the fourth place face each other in the circumferential direction and the second place and the third place face each other in the circumferential direction. High-density magnetic force lines connected between the first place and the fourth place are formed between the first place and the fourth place and high-density magnetic force lines connected between the second place and the third place are formed between the second place and the third place. On the other hand, the magnetic force lines passing through the inside of the inner circumferential surface of the inner ring, that is, the magnetic force lines passing through the rotary shaft, are significantly reduced.

According to the present invention, the above-described phenomenon occurs when the ball bearing is mounted in the rotary shaft fixed with the 2-pole permanent magnet and thus the magnetic force lines passing through the rotary shaft are significantly reduced. Accordingly, since overcurrent which occurs in the rotary shaft due to the magnetic force lines passing through the rotary shaft is significantly reduced, the increase of the temperature of the rotary shaft can be significantly reduced.

According to the present invention, since the outer and inner rings are made of a ferromagnetic material, for example, steel having high hardness, such as bearing steel, stainless steel or tool steel, may be used. Thus, the strength of the ball bearing can increase, the ball bearing has a high impact strength too, and durability is improved. Since a material which is not very expensive, such as bearing steel, stainless steel or tool steel, can be used as the material of the inner and outer rings, the manufacturing cost of the ball bearing hardly increases.

In the ball bearing the balls may be made of a non-magnetic material.

According to the above-described construction, since the balls are made of the non-magnetic material, magnetic force lines do not pass through the balls. Accordingly, the first place and the fourth place can reliably face each other in the circumferential direction and the second place and the third place can reliably face each other in the circumferential direction. In addition, the magnetic force located in the inner circumference of the inner ring can be reduced.

According to the ball bearing of the present invention, when the ball bearing is mounted in the rotary shaft fixed with the 2-pole permanent magnet, the magnetic force lines passing through the rotary shaft due to the magnetization of the inner ring can be significantly reduced. Accordingly, since overcurrent which occurs in the rotary shaft due to the magnetic force lines passing through the rotary shaft is significantly reduced, the increase of the temperature of the rotary shaft can be significantly reduced.

According to the present invention, since the outer and inner rings are made of a ferromagnetic material, for example, steel having high hardness, such as bearing steel, stainless steel or tool steel, may be used. Thus, the strength of the ball bearing can increase and the ball bearing has high impact strength. Since a material which is not expensive, such as bearing steel, stainless steel or tool steel, can be used as the material of the inner and outer rings, the manufacturing cost of the ball bearing hardly increases.

DETAILED DESCRIPTION OF THE PREFERRED EMBODIMENTS

Hereinafter, embodiments of the present invention will be described in detail.

Figure 1:
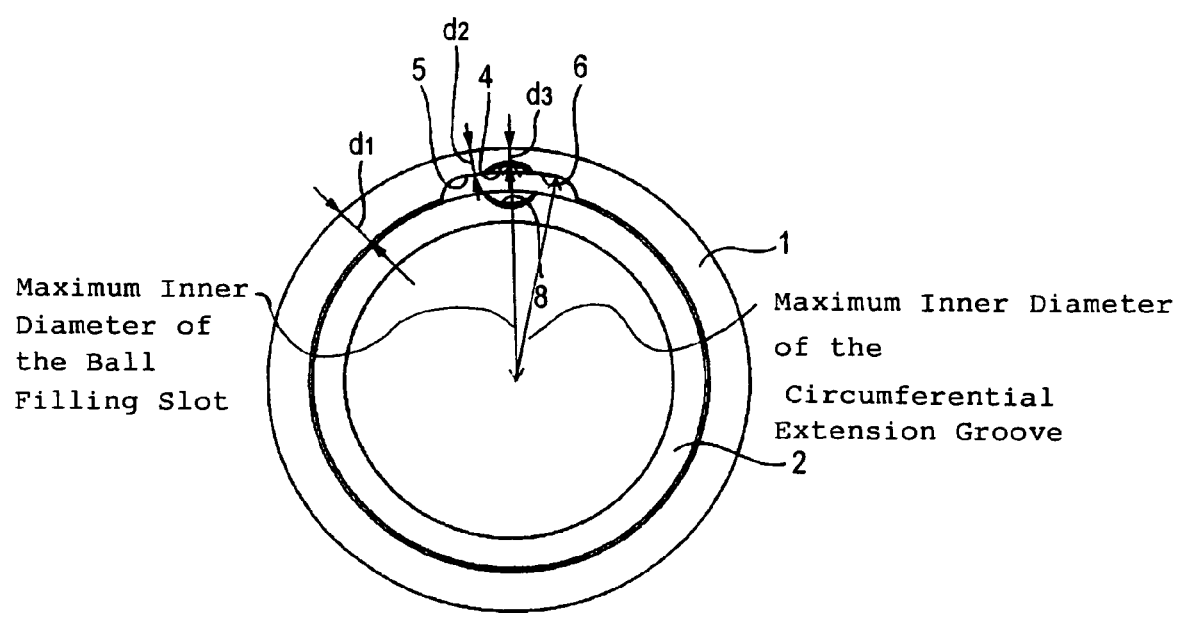
FIG. 1 is a front view of a full ball type deep groove ball bearing according to a first embodiment of the present invention when viewed from one side of an axial direction.

FIG. 1 is a front view of a full ball type deep groove ball bearing according to a first embodiment of the present invention when viewed from one side of an axial direction.

Figure 5:
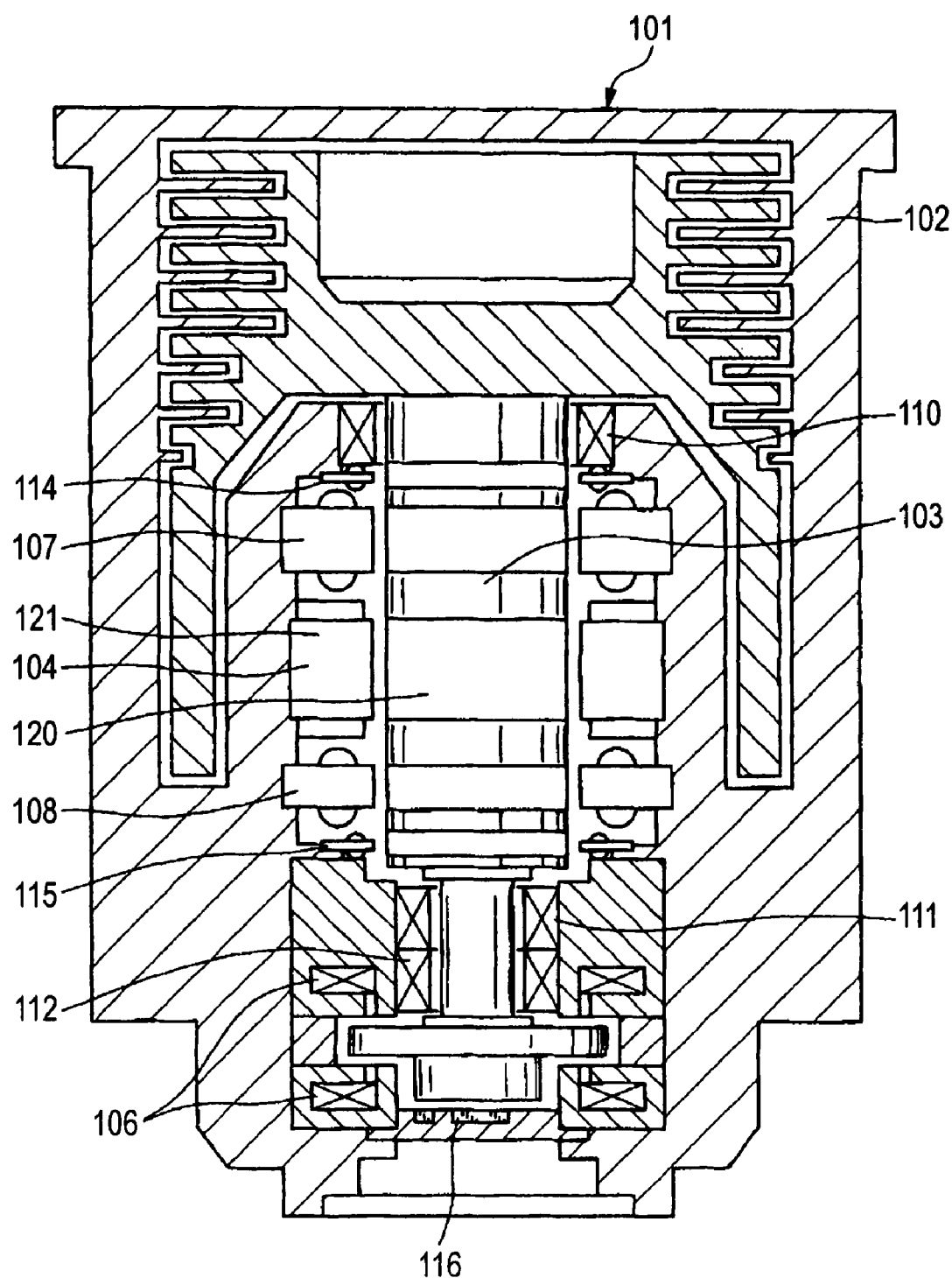
FIG. 5 is a cross-sectional view of a turbo-molecular pump having a deep groove ball bearing which is a second embodiment of a ball bearing according to the present invention in an axial direction.

The full ball type deep groove ball bearing is used as a touchdown bearing of a turbo-molecular pump as described later in the second embodiment (FIG. 5). That is, the full ball type deep groove ball bearing mechanically is brought into contact with a rotary shaft of the turbo-molecular pump such that the rotary shaft is rotatably supported with respect to a housing of the turbo-molecular pump when a magnetic bearing of the turbo-molecular pump is out of control.

The full ball type deep groove ball bearing includes an outer ring 1, an inner ring 2, and a ball (not shown in FIG. 1). The outer ring 1 is a fixed ring which is fitted into the inner circumferential surface of the housing of the turbo-molecular pump and the inner ring 2 is a rotary ring which is provided outwardly in a radial direction of the rotary shaft of the turbo-molecular pump. The inner circumferential surface of the inner ring 2 is brought into contact with the rotary shaft when the magnetic bearing is out of control. The outer ring 1 and the inner ring 2 are made of steel such as bearing steel, stainless steel, or tool steel and the balls are made of ceramic such as silicon nitride ($Si_3N_4$). The outer ring 1 has a first ball filling slot 4 having a substantially semicircular opening shape and has circumferential extension grooves 5,6 which extend from the first ball filling slot 4 by a predetermined length in a circumferential direction at the opposite sides of the circumferential direction of the first ball filling slot 4.

Meanwhile, the inner ring 2 has a second ball filling slot 8 having a substantially semicircular opening shape at a position facing the first ball filling slot 4 of the outer circumferential surface in the radial direction. The opening of the first ball filling slot 4 and the opening of the second ball filling slot 8 form together a substantially circular opening. The substantially circular shape is set to be slightly smaller than a large circle of the ball (a circle drawn by the circumference of the ball in a section passing through the center of the ball) such that the ball which has been inserted into the bearing does not escape from the bearing. The circumferential extension grooves 5,6 are not formed in the inner ring 2 as the rotary ring, but are formed in the outer ring 1 as the fixed ring. By forming the circumferential extension grooves 5,6 in the fixed ring, a problem which occurs when the circumferential extension grooves are formed in the rotary ring, that is, ununiformity in rotation of the rotary ring which occurs due to large thickness difference along the circumferential direction of the rotary ring, is not caused.

The thickness d1 of a circumferential part which does not have the first ball filling slot 4 and the circumferential extension grooves 5,6 on the outer ring 1 is larger than the thickness d2 of a circumferential part having the circumferential extension grooves 5,6 of the outer ring 1. In addition, the thickness d2 of the radial direction of the circumferential part having the circumferential extension grooves 5,6 of the outer ring 1 is larger than the thickness d3 of the radial direction of the circumferential part having the first ball filling slot 4 of the outer ring 1.

Figure 2:
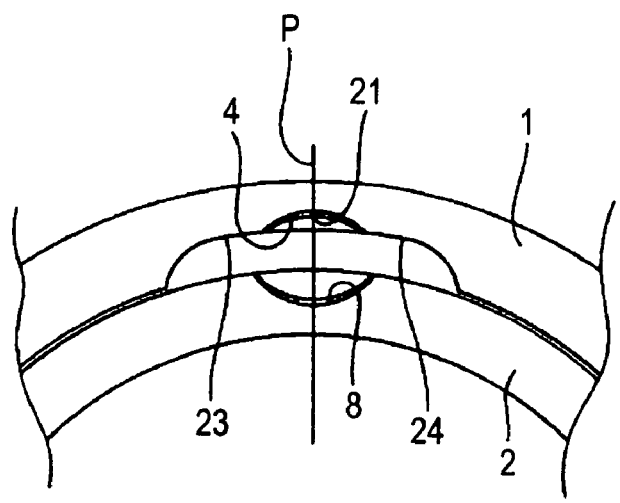
FIG. 2 is a partial enlarged view of circumferential extension grooves shown in FIG. 1.

FIG. 2 is a partial enlarged view of the circumferential extension grooves shown in FIG. 1.

The first ball filling slot 4 has a bottom 21 having a maximum outer diameter. The first ball filling slot 4 is plane-symmetrical to a plane P passing through the bottom 21 and the central shaft of the outer ring 1. Each of the circumferential extension grooves 5,6 extends from the first ball filling slot 4 by a predetermined distance in the circumferential direction. As shown in FIG. 1, the circumferential extension grooves 5,6 have cylindrical surface parts 23,24 having a maximum outer diameter substantially identical to each other recessed outwardly in the radial direction. Each of the cylindrical surface parts 23,24 extends in the circumferential direction. The outer diameter of the bottom 21 is larger than those of the cylindrical surface parts 23,24.

Figure 3:
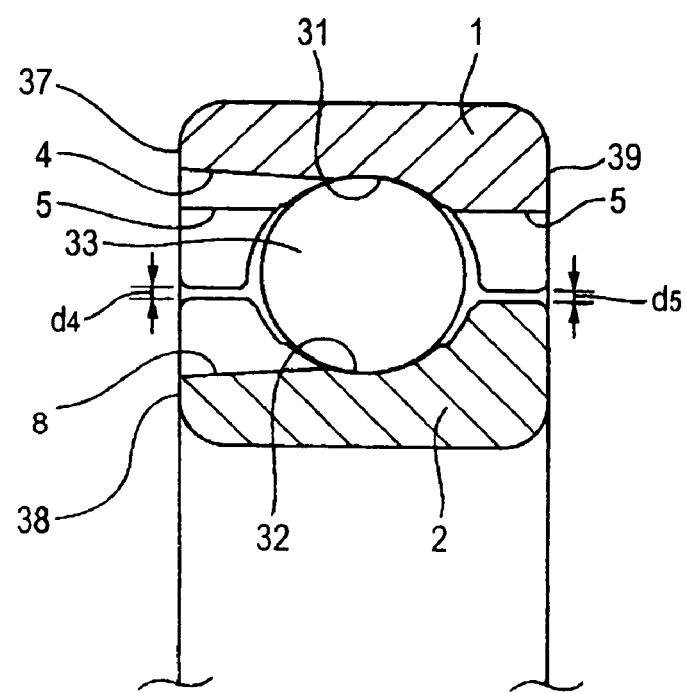
FIG. 3 is a cross-sectional view of an axial direction which passes through first and second ball filling slots of the full ball type deep groove ball bearing according to the first embodiment.

FIG. 3 is a cross-sectional view of an axial direction which passes through first and second ball filling slots 4,8 of the full ball type deep groove ball bearing according to the present embodiment.

As shown in FIG. 3, the outer ring 1 has a raceway groove 31 in its inner circumferential surface and the inner ring 2 has a raceway groove 32 in its outer circumferential surface. The ball 33 is provided in plural between the raceway groove 31 of the outer ring 1 and the raceway groove 32 of the inner ring 2. In a state that all balls 33 contact in the circumferential direction without a gap, a circumferential space corresponding to one ball 33 or more exists between the raceway groove 31 of the outer ring 1 and the raceway groove 32 of the inner ring 2.

As shown in FIG. 3, the first ball filling slot 4 extends from a first end face 37 of one side of the axial direction of the outer ring 1 to the raceway groove 31 of the outer ring 1 in the axial direction. The first ball filling slot 4 communicates with the raceway groove 31 of the outer ring 1. The second ball filling slot 8 extends from a second end face 38 of one side of the axial direction of the inner ring 2 to the raceway groove 32 of the inner ring 2 in the axial direction. The second ball filling slot 8 communicates with the raceway groove 32 of the inner ring 2.

Meanwhile, the circumferential extension grooves 5,6 extend from the first raceway groove 31 to the first end face 37 of one side of the axial direction of the outer ring 1 and extend from the first raceway groove 31 to an end face 39 of the other side of the axial direction of the outer ring 1.

A minimum distance d4 between a shoulder of one side of the axial direction of the first raceway groove 31 of the outer ring 1 and a shoulder of one side of the axial direction of the second raceway groove 32 of the inner ring 2 is set to be ¼ or less of the diameter of the ball 33 and in a range of 0.4 to 0.5 mm. A minimum distance d5 between a shoulder of the other side of the axial direction of the first raceway groove 31 of the outer ring 1 and a shoulder of the other side of the axial direction of the second raceway groove 32 of the inner ring 2 is set to be ¼ or less of the diameter of the ball 33 and in a range of 0.4 to 0.5 mm. That is, the minimum distance between the adjacent shoulders of the raceway grooves 31 and 32 of the outer ring 1 and the inner ring 2 is set to be ¼ or less of the diameter of the ball 33 and in a range of 0.4 to 0.5 mm.

Figure 4:
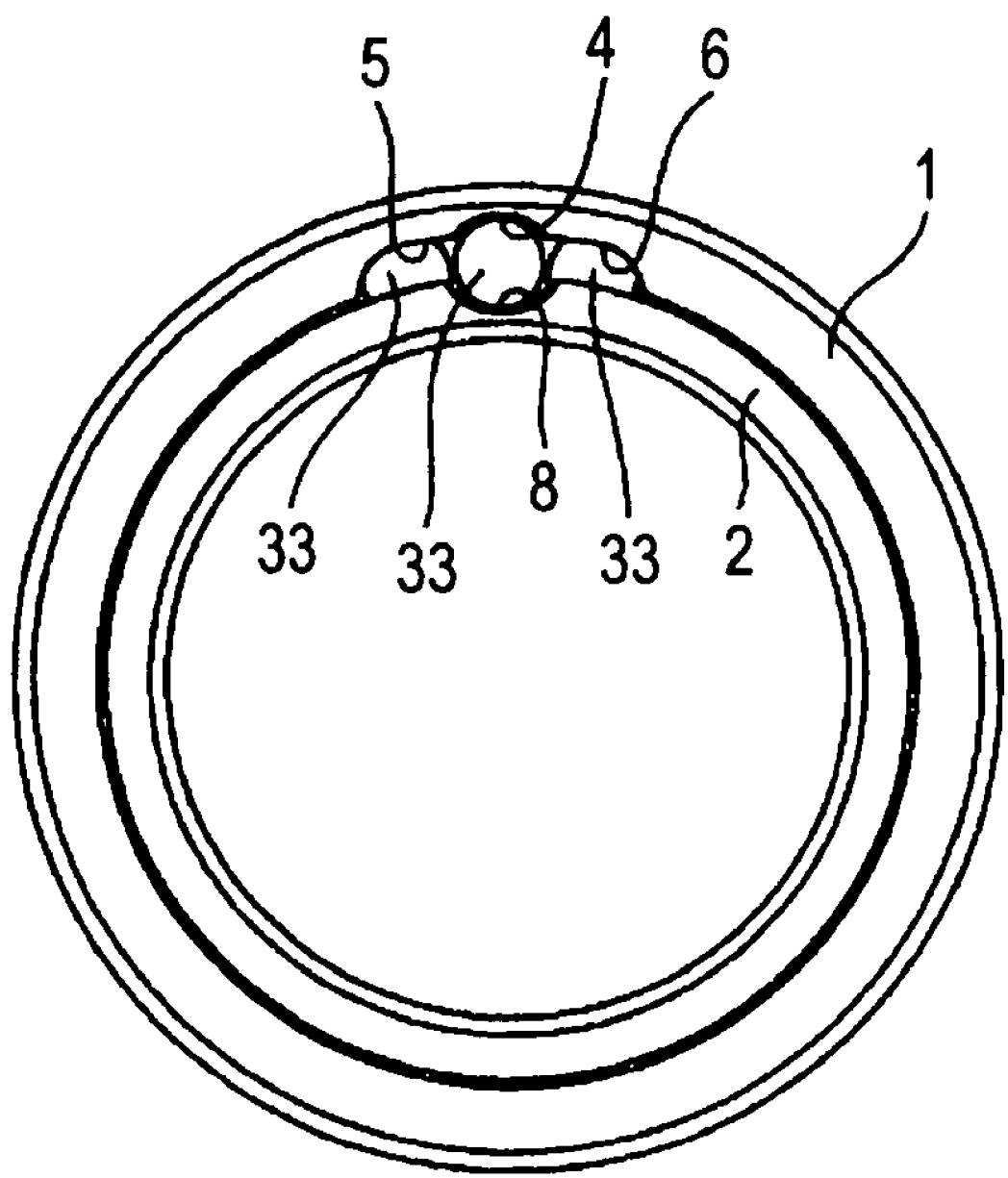
FIG. 4 is a view showing the full ball type deep groove ball bearing according to the first embodiment when balls are mounted.

FIG. 4 is a view showing a state when the ball 33 is mounted.

When the balls 33 are inserted into the full ball type deep groove ball bearing, the half of a total number of balls 33 to be inserted are received in a raceway groove of the outer ring 1 or the inner ring 2. The other of the inner ring 2 or the outer ring 1 in which the balls 33 are not received in the raceway groove is disposed so as to cover the outer ring 1 or the inner ring 2 in which the balls 33 are received in the raceway groove such that the half of the balls 33 are covered. Then, the inner and outer rings and the half of the balls 33 are mounted at a predetermined place. Finally, as shown in FIG. 4, another half of the balls 33 placed in the vicinity of the first and second ball filling slots 4,8 are directly pressed and inserted into the bearing one by one.

Alternatively, after the assembly composed of the inner and outer rings 2,1 and the half of the balls 3 are mounted at the predetermined place, although it not shown, a jig (not shown) such as a wedge is inserted between into the first and second ball filling slots 4,8 and the circumferential extension grooves 5,6 such that the inner and outer rings 2,1 are curved and the first and second ball filling slots 4,8 extend in the radial direction. Another half of the balls is inserted into the bearing through the extended first and second ball filling slots 4,8 one by one.

According to the bearing of the above-described embodiment, since the outer ring 1 has the circumferential extension grooves 5,6 which extend from the first ball filling slot 4 by the predetermined length in the circumferential direction at the opposite sides of the circumferential direction of the first ball filling slot 4, extend from the first raceway groove 31 to the first end face 37 of one side of the axial direction of the outer ring 1, and have a maximum inner diameter smaller than a maximum inner diameter of the first ball filling slot 4, the rigidity of the periphery of the first ball filling slot 4 of the outer ring 1 can decrease locally. When the ball 33 is pressed and inserted, strain which occurs in the bearing rings 1,2 can be received by the ball filling slots 4,8 and the circumferential extension grooves 5,6. Therefore, the strain can be significantly reduced and the flexibility of the periphery of the first ball filling slot 4 of the outer ring 1 can be improved. Accordingly, it is possible to easily insert the ball 33 into the bearing, to suppress damage which occurs in the ball 33 and the peripheries of the ball filling slots 4,8 of the bearing rings 1,2 when the ball 33 is inserted, and to suppress plastic deformation of the peripheries of the ball filling slots 4,8 of the bearing rings 1,2.

According to the ball bearing of the above-described embodiment, since the outer ring 1 has the circumferential extension grooves 5,6 at the opposite sides of the circumferential direction of the first ball filling slot 4, the jig (wedge) can be inserted into the circumferential extension grooves 5,6 even when the gap between the inner diameter of the inner circumferential surface of the outer ring 1 and the outer diameter of the outer circumferential surface of the inner ring 2 at a position where the circumferential extension grooves 5,6 do not exist is very small like the present embodiment. Accordingly, the method of inserting the ball using the jig can be used.

According to the ball bearing of the above-described embodiment, since the minimum distance between the shoulder of the other side of the axial direction of the first raceway groove 31 of the outer ring 1 and the shoulder of the other side of the axial direction of the second raceway groove 32 of the inner ring 2 is ¼ or less of the diameter of the ball 33 and the distance between the shoulder of the other side of the axial direction of the first raceway groove 31 of the outer ring 1 and the shoulder of the other side of the axial direction of the second raceway groove 32 of the inner ring 2 is reduced compared with the conventional art, the strength of the ball bearing is not reduced even when the circumferential extension grooves 5,6 which may reduce the strength of the ball bearing are formed in the ball bearing. Thus, the ball bearing can hold a predetermined strength.

Although the outer ring 1 is the fixed ring and the inner ring 2 is the rotary ring in the above-described embodiment, the present invention is applicable to a case where the outer ring is the rotary ring and the inner ring is the fixed ring.

Although the openings of the first and second ball filling slots 4,8 has a substantially semicircular shape in the above-described embodiment, the openings of the first and second ball filling slots may have a semi-elliptical shape based on a short axis or a long axis or the shape of the periphery of a convex portion of a parabola, or the shape of a portion of a closed curve in the present invention.

Although the circumferential extension grooves are formed in the outer ring in the full ball type deep groove ball bearing according to the above-described embodiment, the circumferential extension grooves may be formed in the inner ring in the present invention. In particular, when the outer ring is the rotary ring and the inner ring is the fixed ring, the circumferential extension grooves are preferably formed in the inner ring. When the circumferential extension grooves are formed in the inner ring, the circumferential extension grooves are formed at the opposite sides of the circumferential direction of the second ball filling slot of the inner ring so as to extend from the second ball filling slot of the inner ring by a predetermined length in the circumferential direction, extend from the second raceway groove of the inner ring to the second end face of the inner ring in the axial direction, and have a minimum outer diameter larger than the minimum outer diameter of the second ball filling slot of the inner ring. When the circumferential extension grooves are formed in the inner ring as described above, the same effects as the above-described embodiment can be obtained.

The circumferential extension grooves may be formed in the directions of the outer ring and the inner ring. For example, the circumferential extension grooves described in the above-described embodiment may be formed in the outer ring and the circumferential extension grooves may be formed in the inner ring so as to face the circumferential extension grooves formed in the outer ring in the radial direction. In this case, the flexibility of the bearing ring may be significantly improved.

Second Embodiment

FIG. 5 is a cross-sectional view of a turbo-molecular pump having a deep groove ball bearing 110, which is a second embodiment of a ball bearing according to the present invention, in an axial direction of the pump.

The turbo-molecular pump includes a turbo-molecular pump body 101 and an unshown controller, which communicates with an unshown vacuum apparatus.

The turbo-molecular pump body 101 includes a housing 102, a rotary shaft 103, a motor 104 for driving the rotary shaft 103, an axial magnetic bearing 106 for magnetically supporting the rotary shaft 103 in an axial direction with non-contact state, and first and second radial magnetic bearings 107 and 108 for magnetically supporting the rotary shaft 103 in a radial direction with non-contact state.

The turbo-molecular pump body 101 includes a deep groove ball bearing 110 according to the second embodiment of the present invention, which mechanically supports the rotary shaft 103 in the radial direction and functions as a touchdown bearing when the first and second radial magnetic bearings 107 and 108 become out of control, and angular ball bearings 111 and 112 which mechanically support the rotary shaft 103 in the radial direction and function as the touchdown bearing when the first and second radial magnetic bearings 107 and 108 are out of control.

The turbo-molecular pump body 101 includes radial position detection sensors 114 and 115 for detecting the radial position of the rotary shaft 103 and an axial position detection sensor 116 for detecting the axial position of the rotary shaft 103. The radial position detection sensors 114 and 115 are spaced apart from each other with a gap therebetween in the axial direction of the rotary shaft 103.

The motor 104 has a rotor 120 and a stator 121. The rotor 120 is formed of a ring-shaped 2-pole permanent magnet and fixed to the outer circumferential surface of the rotary shaft 103. The stator 121 has an unshown armature coil. When current properly flows in the armature coil, the rotor 120 rotates in high speed with respect to the stator 121 and the rotary shaft 103 fixed with the rotor 120 rotates in high speed. The motor 104 functions as a generator. In detail, the motor 104 outputs a voltage as the generator when power supply from a power source is interrupted due to power failure or interruption of power supply to decrease a power supply voltage. In more detail, the motor 104 supplies regenerative electric power to the position detection sensors 114,115,116, a magnetic bearing driving circuit (not shown), and a motor driver (not shown) when the power supply voltage decreases. While the regenerative electric power supplied from the motor 104 drives the magnetic bearings 106,107,108, the magnetic bearings 106,107,108 are controlled with magnetic suspension by the regenerative electric power.

The axial magnetic bearing 106 has a pair of electromagnets (the number of electromagnets is two) provided such that the opposite end faces of the axial direction of the rotary shaft 103 are inserted therebetween from the opposite sides of the axial direction. Each of the first and second radial magnetic bearings 107,108 has two pairs of electromagnets (the number of electromagnets is four in each radial magnet bearing) which are perpendicular to each other and are provided such that the rotary shaft 103 is inserted therebetween from the opposite sides of the radial direction. By properly controlling magnetic forces of the electromagnets of the magnet bearings 106,107,108, the rotary shaft 103 which rotates by several ten thousands times per minute are precisely controlled to control the oscillation of the rotary shaft 103 and the rotary shaft 103 are positioned at a predetermined position with high precision.

When the rotation speed of the motor 104 decreases and the regenerative electric power from the motor 104 becomes lower than the power necessary for driving the magnetic bearings 107,108 upon power failure or interruption of power supply, the magnetic suspension control of the magnetic bearings 107,108 stops. When the magnetic suspension control of the magnetic bearings 107,108 stops, the deep groove ball bearing 110 and the angular ball bearings 111,112 functioning as the touchdown bearing mechanically support the rotary shaft 103 in the radial direction, instead of the magnetic bearings 107,108. The deep groove ball bearing 110 and the angular ball bearings 111,112 support the rotary shaft 103 to reliably prevent the contact between the magnetic bearings 107,108 and the rotary shaft 103 or the contact between the rotor 120 and the stator 121 when the magnetic bearings 107,108 are out of control.

Figure 6:
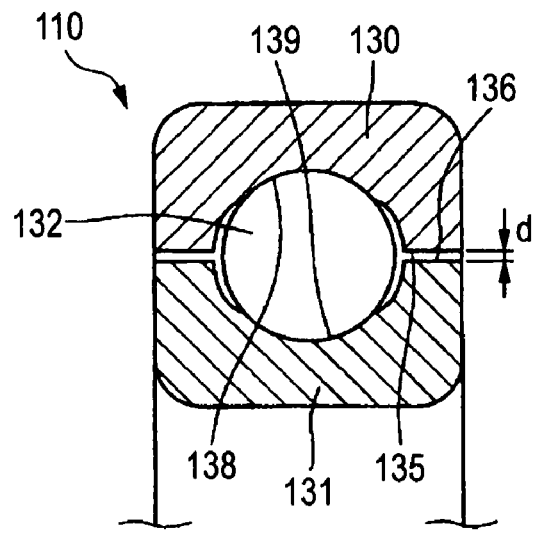
FIG. 6 is a cross-sectional view showing the deep groove ball bearing according to the second embodiment in the axial direction.

FIG. 6 is a cross-sectional view showing the deep groove ball bearing 110 according to the second embodiment of the present invention in the axial direction.

The deep groove ball bearing 110 is a so-called full type ball bearing without a cage. The deep groove ball bearing 110 has an outer ring 130, an inner ring 131, and balls 132. Incidentally, although it is not shown in FIG. 6, the ball bearing 110 includes first and second ball filling slots on the bearing rings. Circumferential extension grooves are also formed on the opposite side of the first ball filling slot in the circumferential direction on the outer ring 130, similarly to the first embodiment. Detailed explanation of the ball filling slots and the circumferential extension grooves will be omitted because it is similar to that of the first embodiment.

The outer ring 130 is made of a ferromagnetic steel such as bearing steel, stainless steel, or tool steel. The outer ring 130 has a deep groove type raceway groove 138 in its inner circumferential surface. Meanwhile, the inner ring is made of a ferromagnetic steel such as bearing steel, stainless steel, or tool steel. The inner ring 131 has a deep groove type raceway groove 139 in its inner circumferential surface.

The balls 132 are made of a non-magnetic material such as silicon nitride ($Si_3N_4$). The balls 132 are provided in plural between the raceway groove 138 of the outer ring 130 and the raceway groove 139 of the inner ring 131. A circumferential space corresponding to one or more balls 132 exist between the raceway groove 138 of the outer ring 130 and the raceway groove 139 of the inner ring 131 in a state of contacting all balls 132 in the circumferential direction without a gap.

Although not shown, in the deep groove ball bearing 110, the gap of the radial direction of the outer ring 130 and the inner ring 131 of a portion of the circumferential direction (continuity of the circumferential direction) is larger than that of the radial direction of the outer ring 130 and the inner ring 131 of a portion other than the portion. That is, the deep groove ball bearing 110 has a filling slot (groove provided in the axial direction of the bearing ring in order to insert the ball 132) in a portion of the circumferential direction.

At the side in which the filling slot is not provided or the side in which the filling slot is provided with respect to the raceway groove of the deep groove ball bearing 110, the distance d between the shoulder 135 of the outer ring 130 and the shoulder 136 of the inner ring 131 of a portion except for the vicinity of the filling slot is in a range of 0.4 to 0.5 mm and is set to be ¼ or less of the diameter of the ball 132. Accurately, the distance between the shoulders 135,136 of the outer and inner rings 130,131 of the portion other than the filling slot of one side of the raceway is set to 0.5 mm or less.

Figure 7:
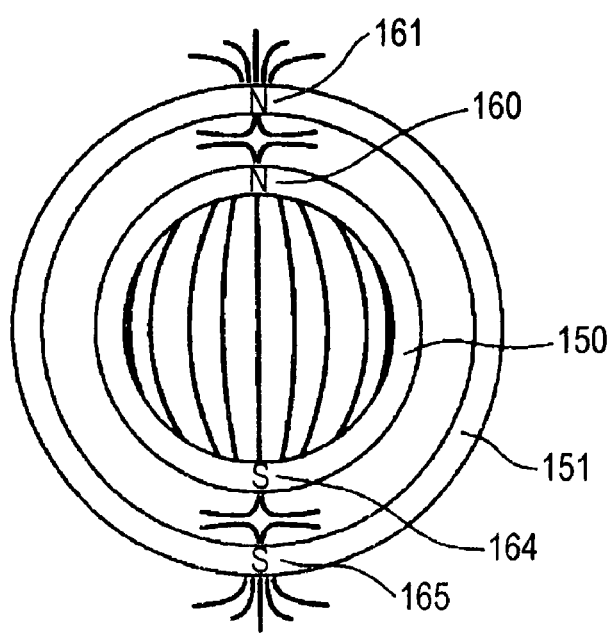
FIG. 7 is a view illustrating a phenomenon which occurs in a bearing ring of the ball bearing according to the present invention when the ball bearing according to the present invention and a rotary shaft (to which a ring-shaped rotor having a 2-pole permanent magnet is fixed) are assembled.
Figure 8:
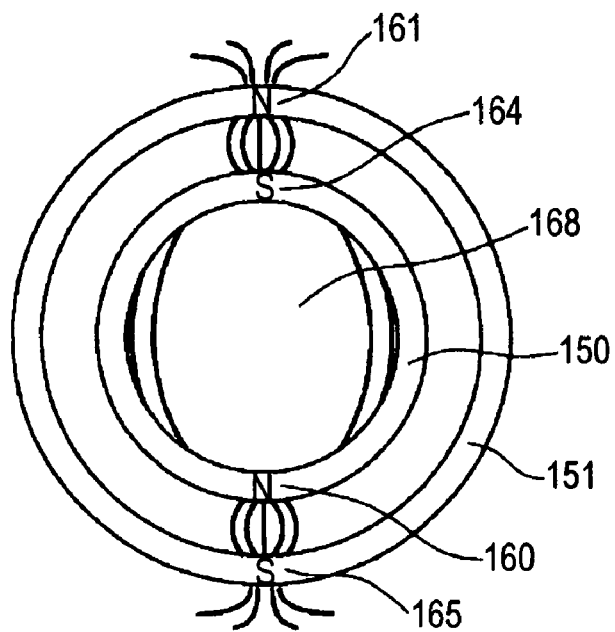
FIG. 8 is a view illustrating a phenomenon which occurs in the bearing ring of the ball bearing according to the present invention when the ball bearing according to the second embodiment and the rotary shaft (to which a ring-shaped rotor having the 2-pole permanent magnet is fixed) are assembled.

FIGS. 7 and 8 are views illustrating a phenomenon which occurs in the bearing ring of another example of the ball bearing according to the second embodiment of the present invention when the ball bearing according to the present invention and the rotary shaft to which a ring-shaped rotor having the 2-pole permanent magnet is fixed are assembled. In FIGS. 7 and 8, a reference numeral 150 is an inner ring and 151 is an outer ring.

First, after the ball bearing is mounted in the housing (not shown) of the body of the turbo-molecular pump, the inner and outer rings 150,151 are magnetized by the 2-pole permanent magnet while the 2-pole permanent magnet (not shown) fixed to the rotary shaft (not shown) passes through the inside of the inner circumferential surface of the inner ring 150. In particular, as shown in FIG. 7, a first place 160 of the inner ring 150 which approaches the S pole (not shown) of the 2-pole permanent magnet and a second place 161 of the outer ring 151 in the same circumferential direction as the first place 160 are magnetized to a first pole (N pole), and a third place 164 of the inner ring 150, which approaches the N pole (not shown) of the 2-pole permanent magnet, opposite to the first place 160 of the inner ring 150 with the rotary shaft interposed therebetween and a fourth place 165 of the outer ring 151 opposite to the second place 161 of the outer ring 151 with interposed therebetween are magnetized to a second pole (S pole).

Next, after the 2-pole permanent magnet fixed to the rotary shaft passes through the inside of the inner circumferential surface of the inner ring 150, the inner ring 150 rotates by about 180° in the circumferential direction because the inner and outer ring 150,151 are made of a ferromagnetic material and the distance between the shoulders of at least one of the inner and outer rings 150,151 is much smaller than that of the conventional ball bearing. In particular, as shown in FIG. 8, the inner ring 150 rotates by about 180° such that the repulsion of the magnetic force between the inner ring 150 and the outer ring 151 are reduced. The first place 160 and the fourth place 165 face each other in the circumferential direction and the second place 161 and the third place 164 face each other in the circumferential direction. High-density magnetic force lines connected between the first place 160 and the fourth place 165 are formed between the first place 160 and the fourth place 165 and high-density magnetic force lines connected between the second place 161 and the third place 164 are formed between the second place 161 and the third place 164. On the other hand, the magnetic force lines passing through the inside 168 of the inner circumferential surface of the inner ring 150, that is, the magnetic force lines passing through the rotary shaft, are significantly reduced.

Accordingly, if the inner rings 150,151 are made of a magnetic material and the distance between the shoulders of one side of the axial direction of the raceway grooves of the inner and outer rings 150,151 is set to be ¼ or less of the diameter of the ball, the above-described phenomenon occurs when the ball bearing is mounted in the rotary shaft fixed with the 2-pole permanent magnet and the magnetic force lines passing through the rotary shaft are significantly reduced. Accordingly, since overcurrent which occurs in the rotary shaft due to the magnetic force lines passing through the rotary shaft is significantly reduced, the increase of the temperature of the rotary shaft can be significantly reduced.

Figure 9:
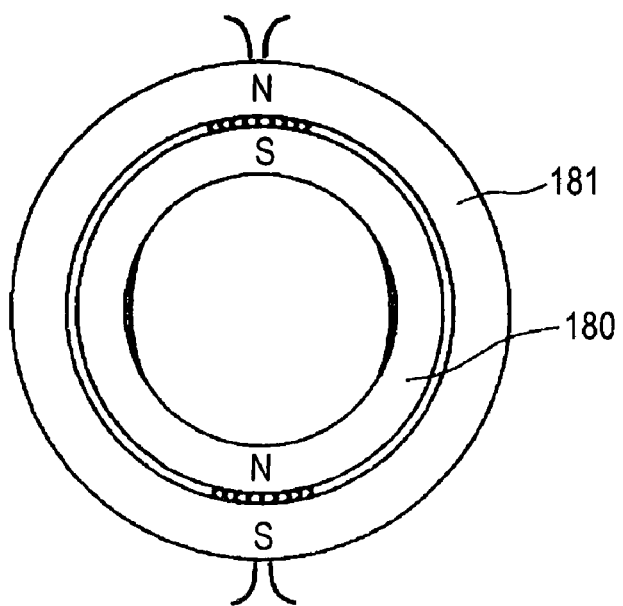
FIG. 9 is a view showing a ball bearing according to another embodiment of the present invention.

FIG. 9 is a view showing another example of the ball bearing of the second embodiment of the present invention in a state that a rotary shaft of the ball bearing in which the distance between shoulders of one side of the axial direction of raceway grooves of inner and outer rings 180,181 is set to be 0.5 mm or less is mounted (a state corresponding to the state shown in FIG. 8).

The inventors have verified through a number of experiments that, if the distance between the shoulders of one side of the axial direction of the raceway grooves of the inner and outer rings 180,181 is 0.5 mm or less as shown in FIG. 9, it is possible to efficiently prevent the increase of the temperature of the rotary shaft due to the magnetization of the inner and outer rings 180,181 and to suppress the increase of the temperature of the rotary shaft even when the rotary shaft rotates relative to the housing in a state that the rotary shaft does not contact the inner ring 180 after the outer ring 180 and the rotary shaft are assembled. This is because the distance between the shoulders of one side of the inner and outer rings 180,181 is significantly smaller than that of the conventional ball bearing and the interaction between the inner and outer rings 180,181 after mounting significantly increases, thereby significantly decreasing the magnetic field of the inside of the outer circumferential surface of the inner ring.

According to the ball bearing 110 of the second embodiment, since the inner and outer rings 130,131 are made of a non-magnetic material and the distance between the shoulders 135,136 of the outer and inner rings 130,131 of one side of the axial direction is ¼ or less of the diameter of the ball 132, the magnetic force lines passing through the rotary shaft 103, which occur due to the magnetization of the inner ring 131, can significantly decrease after the ball bearing 110 is mounted in the rotary shaft 103 fixed with the 2-pole permanent magnet. Accordingly, since overcurrent which occurs in the rotary shaft due to the magnetic force lines passing through the rotary shaft 103 significantly decreases, it is possible to suppress the increase of the temperature of the rotary shaft 103.

According to the ball bearing 110 of the second embodiment, since the outer and inner rings 130,131 are made of a ferromagnetic material, for example, steel having high hardness, such as bearing steel, stainless steel or tool steel, may be used. Thus, the strength of the ball bearing 110 can increase, the ball bearing has high impact strength, and durability does not deteriorate. Since a material that is not expensive, such as bearing steel, stainless steel or tool steel, is used as the material of the outer and inner rings 130,131, the manufacturing cost of the ball bearing 110 hardly increases.

According to the ball bearing 110 of the above-described embodiment, since the ball 132 is made of a non-magnetic material, the magnetic force lines are not generated in the ball 132. Accordingly, a strong interaction can reliably occur between the outer and inner 130,131 after the rotary shaft 103 is mounted in the ball bearing 110 and the magnetic field of the inside of the inner circumferential surface of the inner ring 131 can reliably weaken after the rotary shaft 103 is mounted in the ball bearing 110.

Although bearing steel, stainless steel or tool steel is employed as the material of the outer and inner rings 130,131 in the ball bearing 110 of the second embodiment, in the present invention, ferromagnetic steel which is subjected to a hardening treatment may be employed as the material of the outer and inner rings 130,131, instead of bearing steel, stainless steel or tool steel. Although the ball 132 made of silicon nitride ($Si_3N_4$) is employed in the ball bearing 110 of the above-described embodiment, in the present invention, a ball made of ceramics may be employed instead of silicon nitride ($Si_3N_4$). If the ball made of ceramics is used, it is possible to improve the durability of the ball. In the present invention, the materials of the inner and outer rings and the ball may be stainless steel. In this case, it is possible to significantly reduce the cost of the ball bearing.

In the second embodiment, the ball bearing 110 is a so-called full type ball bearing and does not have a cage and the distance between the shoulders 135,136 of the outer and inner rings 130,131 other than the filling slot of one side of the raceway groove is set to be 0.5 mm or less. However, the present invention may have a structure that the filling slot is not formed, the distance between the shoulders of the inner and outer rings of one side of the raceway groove is larger than that of the shoulders of the inner and outer rings of the other side of the raceway groove, a ring-shaped portion of a crown-shaped cage is inserted in a space having a large distance between the shoulders of the inner and outer rings. Although the ball bearing 110 is a deep groove ball bearing in the second embodiment, in the present invention, the ball bearing may be an angular ball bearing in which the distance between the shoulders of the inner and outer rings of one side of the raceway groove is larger than the distance between the shoulders of the inner and outer rings of the other side of the raceway groove.

Although the full ball type deep groove ball bearings according to the above-described embodiments are used as the touchdown bearing of the turbo-molecular pump, the ball bearing of the present invention may be used as a bearing other than the touchdown bearing of the turbo-molecular pump.

What is claimed is:

1. A ball bearing comprising:

an outer ring having a first raceway groove and a first ball filling slot which extends from the first raceway groove to a first end face of one side in an axial direction of the ball bearing;

an inner ring having a second raceway groove and a second ball filling slot which extends from the second raceway groove to a second end face of said one side in the axial direction of the ball bearing; and balls provided between the first raceway groove of the outer ring and the second raceway groove of the inner ring, wherein circumferential extension grooves which extend from the first ball filling slot at opposite sides of the first ball filling slot in a circumferential direction of the ball bearing by a predetermined length, and extend from the raceway groove to the end face in the axial direction which correspond to the first ball filling slot, and the circumferential extension grooves have a maximum inner diameter smaller than a maximum inner diameter of the first ball filling slot.

2. The ball bearing according to claim 1, wherein a minimum distance between a shoulder of the first raceway groove on another side of the axial direction of the ball bearing and a shoulder of the second raceway groove on said another side of the axial direction of the bearing is ¼ or less of a diameter of the balls.

3. The ball bearing according to claim 2, wherein said balls are made of a non-magnetic material.

4. The ball bearing according to claim 2, wherein said outer ring and said inner ring are made of ferromagnetic material.

5. The ball bearing according to claim 2, wherein a minimum distance between a shoulder of the first raceway groove on said one side of the axial direction of the ball bearing and a shoulder of the second raceway groove on said one side of the axial direction of the bearing is ¼ or less of a diameter of the balls.

6. The ball bearing according to claim 1, wherein a minimum distance between a shoulder of the first raceway groove on said one side of the axial direction of the ball bearing and a shoulder of the second raceway groove on said one side of the axial direction of the bearing is ¼ or less of a diameter of the balls.

7. The ball bearing according to claim 6, wherein said balls are made of a non-magnetic material.

8. The ball bearing according to claim 6, wherein said outer ring and said inner ring are made of ferromagnetic material.

9. A ball bearing comprising:
an outer ring having a first raceway groove and a first ball filling slot which extends from the first raceway groove to a first end face of one side in an axial direction of the ball bearing;
an inner ring having a second raceway groove and a second ball filling slot which extends from the second raceway groove to a second end face of said one side in the axial direction of the ball bearing; and
balls provided between the first raceway groove of the outer ring and the second raceway groove of the inner ring,
wherein circumferential extension grooves which extend from the second ball filling slot at opposite sides of the second ball filling slot in a circumferential direction of the ball bearing by a predetermined length, and extend from the raceway groove to the end face in the axial direction which correspond to the second ball filling slot, and the circumferential extension grooves have a minimum outer diameter larger than a minimum outer diameter of the second ball filling slot.

10. The ball bearing according to claim 9, wherein a minimum distance between a shoulder of the first raceway groove on another side of the axial direction of the ball bearing and a shoulder of the second raceway groove on said another side of the axial direction of the bearing is ¼ or less of a diameter of the balls.

11. The ball bearing according to claim 10, wherein said balls are made of a non-magnetic material.

12. The ball bearing according to claim 10, wherein said outer ring and said inner ring are made of ferromagnetic material.

13. The ball bearing according to claim 10, wherein a minimum distance between a shoulder of the first raceway groove on said one side of the axial direction of the ball bearing and a shoulder of the second raceway groove on said one side of the axial direction of the bearing is ¼ or less of a diameter of the balls.

14. The ball bearing according to claim 9, wherein a minimum distance between a shoulder of the first raceway groove on said one side of the axial direction of the ball bearing and a shoulder of the second raceway groove on said one side of the axial direction of the bearing is ¼ or less of a diameter of the balls.

15. The ball bearing according to claim 14, wherein said balls are made of a non-magnetic material.

16. The ball bearing according to claim 14, wherein said outer ring and said inner ring are made of ferromagnetic material.

* * * * *